(12) United States Patent
Nicholson (10) Patent No.: US 9,890,608 B2
(45) Date of Patent: Feb. 13, 2018

(54) MECHANICAL SHAFT COUPLING FOR FLUID SYSTEM CONNECTIONS

(71) Applicant: M-I L.L.C., Houston, TX (US)

(72) Inventor: Christopher D. Nicholson, Florence, KY (US)

(73) Assignee: M-I L.L.C., Houston, TX (US)

( * ) Notice: Subject to any disclaimer, the term of this patent is extended or adjusted under 35 U.S.C. 154(b) by 942 days.

(21) Appl. No.: 14/060,692

(22) Filed: Oct. 23, 2013

(65) Prior Publication Data

US 2015/0345251 A1 Dec. 3, 2015

Related U.S. Application Data

(60) Provisional application No. 61/717,358, filed on Oct. 23, 2012.

(51) Int. Cl.

| | |
|---|---|
| *F16K 1/48* | (2006.01) |
| *F16K 31/52* | (2006.01) |
| *F16K 5/02* | (2006.01) |
| *F16K 5/04* | (2006.01) |
| *F16K 5/06* | (2006.01) |
| *B25B 23/00* | (2006.01) |
| *E21B 34/02* | (2006.01) |
| *F16K 1/46* | (2006.01) |
| *F16K 31/528* | (2006.01) |

(52) U.S. Cl.
CPC ............... *E21B 34/02* (2013.01); *F16K 1/46* (2013.01); *F16K 1/48* (2013.01); *F16K 1/482* (2013.01); *F16K 1/487* (2013.01); *F16K 5/0242* (2013.01); *F16K 5/0442* (2013.01); *F16K 5/0647* (2013.01); *F16K 31/528* (2013.01); *F16K 31/5282* (2013.01); *F16K 31/5284* (2013.01); *F16K 31/5286* (2013.01); *B25B 23/0035* (2013.01)

(58) Field of Classification Search
CPC . F16K 1/308; F16K 1/48; F16K 1/482; F16K 1/487; F16K 31/528; F16K 31/5282; F16K 31/5284; F16K 31/5286; F16K 31/60; F16K 35/06; F16K 5/0242; F16K 5/0442; F16K 5/0647; F16K 5/0652; B25B 23/0035; B25B 23/0021
USPC ........................... 251/293; 81/177.2, 177.85
See application file for complete search history.

(56) References Cited

U.S. PATENT DOCUMENTS

| | | | | |
|---|---|---|---|---|
| 1,417,683 | A * | 5/1922 | Parsons | ................. B25B 13/481 |
| | | | | 279/76 |
| 1,565,227 | A * | 12/1925 | Garrison | ............... B23B 31/025 |
| | | | | 279/136 |
| 4,753,142 | A * | 6/1988 | Hornung | ................ B25B 15/001 |
| | | | | 81/429 |

(Continued)

FOREIGN PATENT DOCUMENTS

| | | | | |
|---|---|---|---|---|
| DE | 4243650 | A1 * | 6/1994 | ......... B25B 23/0035 |
| WO | WO 0170465 | A1 * | 9/2001 | ......... B25B 23/0035 |

*Primary Examiner* — Mary McManmon
*Assistant Examiner* — Hailey K Do
(74) *Attorney, Agent, or Firm* — David J. Smith (57) ABSTRACT

A fluid control system includes a choke valve having a first connector shaft; an actuator having a second connector shaft; a collar disposed around the first and second connector shafts; and a spring disposed on the first connector shaft. The collar may have an internal taper and a plurality of engagement pins.

20 Claims, 7 Drawing Sheets

(56) References Cited

U.S. PATENT DOCUMENTS

| | | | | |
|---|---|---|---|---|
| 4,932,293 | A * | 6/1990 | Goff | B25B 23/0035 |
| | | | | 81/121.1 |
| 5,398,946 | A * | 3/1995 | Quiring | B23B 31/1071 |
| | | | | 279/145 |
| 5,579,804 | A * | 12/1996 | Roberts | F16K 35/06 |
| | | | | 137/385 |
| 6,755,423 | B2 * | 6/2004 | Chiu | B23D 51/10 |
| | | | | 279/22 |
| 6,808,182 | B2 * | 10/2004 | Lin | B23B 31/1074 |
| | | | | 279/14 |
| 6,973,858 | B2 * | 12/2005 | Huang | B25B 15/001 |
| | | | | 279/82 |
| 7,159,493 | B1 * | 1/2007 | Huang | B25B 23/0035 |
| | | | | 81/177.85 |
| 2007/0108402 | A1 * | 5/2007 | Davis | F16K 31/041 |
| | | | | 251/293 |
| 2011/0260415 | A1 * | 10/2011 | Lin | B23B 31/1071 |
| | | | | 279/43 |
| 2012/0025474 | A1 * | 2/2012 | Huang | B23B 31/06 |
| | | | | 279/30 |
| 2012/0073408 | A1 * | 3/2012 | Leighton | B25B 13/06 |
| | | | | 81/177.2 |

* cited by examiner

MECHANICAL SHAFT COUPLING FOR FLUID SYSTEM CONNECTIONS

BACKGROUND

There are many applications in which there is a need to control the back pressure of a fluid flowing in a system. For example, in the drilling of oil wells it is customary to suspend a drill pipe in the well bore with a bit on the lower end thereof and, as the bit is rotated, to circulate a drilling fluid, such as a drilling mud, down through the interior of the drill string, out through the bit, and up the annulus of the well bore to the surface. This fluid circulation is maintained for the purpose of removing cuttings from the well bore, for cooling the bit, and for maintaining hydrostatic pressure in the well bore to control formation gases and prevent blowouts, and the like. In those cases where the weight of the drilling mud is not sufficient to contain the bottom hole pressure in the well, it becomes necessary to apply additional back pressure on the drilling mud at the surface to compensate for the lack of hydrostatic head and thereby keep the well under control. Thus, in some instances, a back pressure control device is mourned in the return flow line for the drilling fluid.

One type of back pressure control device that is used in the drilling of wells is known in the industry as a choke, such as a hydraulically controlled choke. Chokes have a choke valve and a choke actuator. The choke valve and choke actuator may be connected through various connections, such as one or more mechanically coupled shafts. During operation of the choke, components of the choke may become damaged or require routine maintenance. To repair damaged components or perform routine maintenance, accessing the internal components of the choke may be necessary. In order to access the internal components of the choke the actuator may have to be removed. Removing the actuator from the choke valve may be a time consuming, labor intensive process.

Despite many valuable contributions from the art, it would be beneficial to develop systems and methods for connecting fluid control systems.

DETAILED DESCRIPTION

In one aspect, embodiments disclosed herein relate to systems and methods for connecting and disconnecting valves. More specifically, embodiments disclosed herein relate to systems and methods for connecting and disconnecting oilfield fluid control devices. More specifically still, embodiments disclosed herein relate to systems and methods for connecting and disconnecting choke valves and choke actuators used in the oilfield.

In one aspect, embodiments disclosed herein relate to a fluid control system. The fluid control system may include: a choke valve having a first connector shaft; an actuator having a second connector shaft; a collar disposed around the first and second connector shafts; and a spring disposed on the first connector shaft. The collar may have: an internal taper and a plurality of engagement pins.

In another aspect, embodiments disclosed herein relate to a method of using an actuator assembly. The method may include: sliding a collar disposed around a first connector shaft and a second connector shaft along the first connector shaft in a first direction; disengaging a plurality of engagement pins from the second connector shaft; and removing the second connector shaft from the collar in a second direction.

In one aspect, embodiments disclosed herein relate to an actuator connection. The actuator connection may include: a first connector shaft comprising a plurality of pin recesses; a collar disposed on the first connector shaft, the collar comprising an internal tapered recess and a plurality of engagement pins; and a second connector shaft configured to engage the first connector shaft within the collar.

Figure 1:
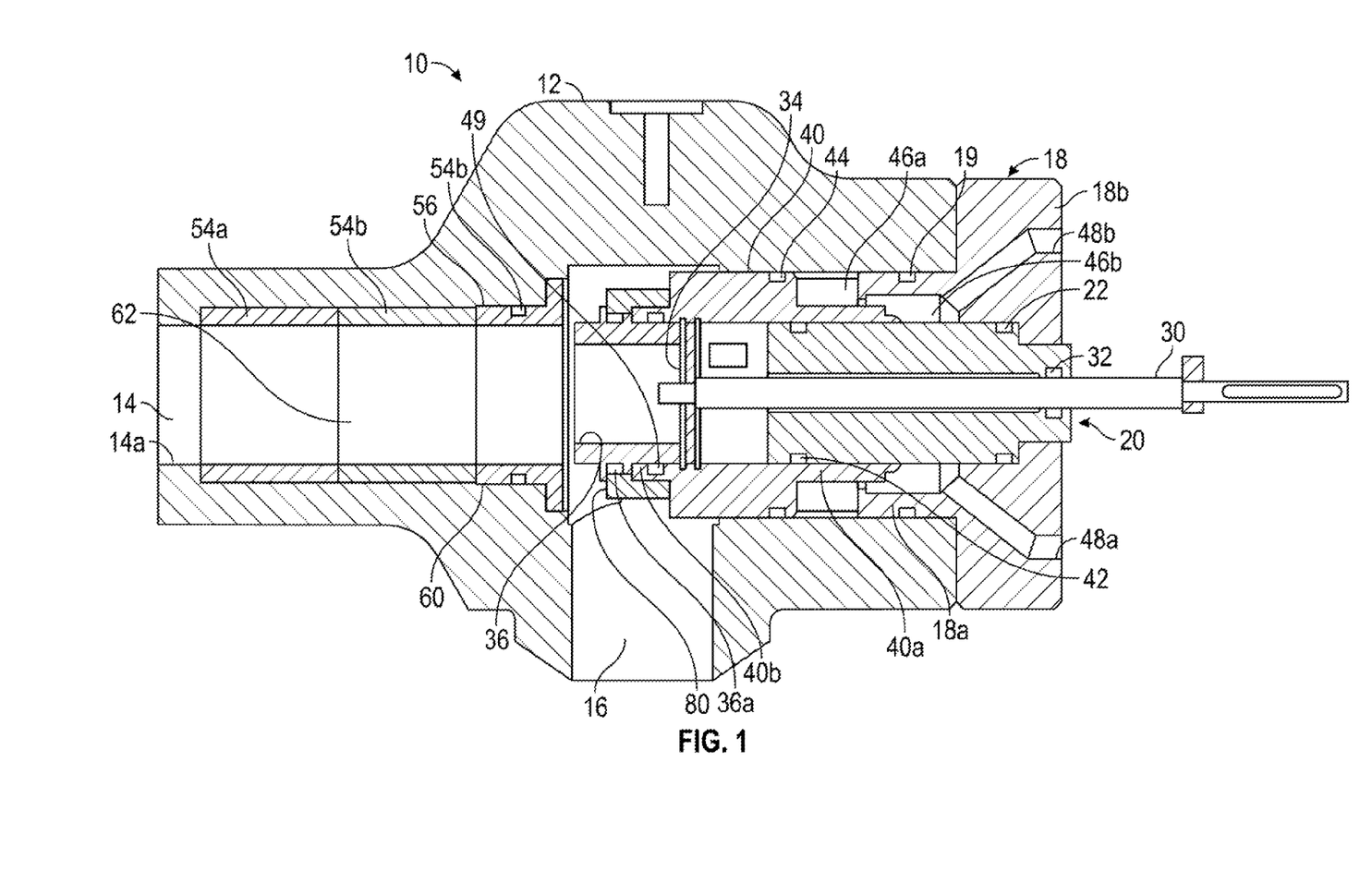
FIG. 1 is a cross-sectional view of a choke according to embodiments of the present disclosure.

Referring now to FIG. 1, a back pressure control system 10 according to embodiments disclosed herein is illustrated. The fluid control system 10 includes a housing 12 having an axial bore 14 extending through its length and having a discharge end 14a. A radially extending inlet passage 16 is also formed in the housing 12 and intersects the bore 14. Connecting flanges (not shown) can be provided at the discharge end 14a of the bore 14 and at the inlet end of the passage 16 to connect them to appropriate flow lines. Drilling or formation fluid from a well is introduced into the inlet passage 16, passes through the housing 12 and normally discharges from the discharge end 14a of the bore 14.

A bonnet 18 is secured to the end of the housing 12 opposite the discharge end 14a of the bore 14. The bonnet 18 is generally T-shaped in cross section and has a cylindrical portion 18a extending into the bore 14 of the housing. A seal ring 19 extends in a groove formed in an outer surface of the cylindrical portion 18a and engages a corresponding inner surface of the housing 12. The bonnet 18 also includes a cross portion 18b that extends perpendicular to the cylindrical portion 18a and is fastened to the corresponding end of the housing 12 in any conventional manner.

A mandrel 20 is secured in the end portion of the bonnet 18, and a seal ring 22 extends between the outer surface of the mandrel 20 and the corresponding inner surface of the bonnet 18. A valve connector shaft 30 is slidably mounted in an axial bore extending through the mandrel 20, and a seal ring 32 extends in a groove formed in the inner surface of the mandrel 20 defining the latter bore. The seal ring 32 engages the outer surface of the connector shaft 30 as the connector shaft 30 slides in the bore of the mandrel 20 under conditions to be described. One end portion of the connector shaft 30 projects from the corresponding ends of the mandrel 20 and the bonnet 18, and the other end portion of the connector shaft 30 projects from the other end of the mandrel 20 and into the bore 14.

In some embodiments, a spacer 34 is mounted on the latter end of the connector shaft 30 in any known manner and is captured between two snap rings (not shown). A cylindrical choke member 36 is disposed in the bore 14 with one end abutting the spacer 34. The choke member 36 is shown in an operating position in FIG. 1 and extends in the intersection of the bore 14 with the inlet passage 16 to control the flow of fluid from the latter to the former, as will be described.

A cylindrical shuttle 40 is slidably mounted over the mandrel 20, and a seal ring 42 extends in a groove formed in an outer surface of the mandrel 20 and engages a corresponding inner surface of the shuttle 40. Similarly, a seal ring 44 extends in a groove formed in an outer surface of the shuttle 40 and engages a corresponding inner surface of the housing 12. The shuttle 40 has a reduced-diameter portion 40a that defines, with the inner surface of the housing 12, a fluid chamber 46a. Another fluid chamber 46b is defined between the outer surface of the mandrel 20 and the corresponding inner surface of the cylindrical portion 18a. The chambers 46a and 46b communicate and receive a control fluid from a passage 48a formed through the bonnet 18. In this context, the control fluid is introduced into the passage 48a, and therefore into the chambers 46a and 46b, at a predetermined, desired set point pressure, such as determined by a set point pressure regulator (not shown) and measured by a gage located on an associated console or control panel not shown).

The control fluid enters the chambers 46a and 46b and acts against the corresponding exposed end portions of the shuttle 40. The shuttle 40 is designed to move, so the force caused by the pressure of the control fluid from the chambers 46a and 46b at the predetermined set point pressure acting on the corresponding exposed end portions of the shuttle 40 is equal to the force caused by the pressure of the drilling or formation fluid in the passage 16 acting on the corresponding exposed end portions of the other end of the shuffle 40 and a shuffle nut 80. Thus, the shuttle 40 is normally in a balanced condition as will be described. A passage 48b is also formed through the bonnet portion 18 for bleeding air from the system through a bleed valve, or the like (not shown) before operation.

The shuttle 40 has an externally threaded, reduced-diameter, end portion 40b which extends over a portion of the choke member 36. A seal ring 49 extends in a groove formed in an inner surface of the end portion 40b and engages a corresponding outer surface of the choke member 36. An internally threaded shuttle nut 80 threadedly engages the end portion 40b of the shuttle 40 and extends over an annular flange 36a formed on the choke member 36, to capture the choke member on the shuttle 40. The shuttle 40, in some embodiments, also has two spaced grooves formed in its inner diameter for receiving the snap rings. Therefore, axial movement of the shuttle 40 over the fixed mandrel 20 causes corresponding axial movement of the choke member 36, and therefore the spacer 34 and the connector shaft 30.

Two or more cylindrical liners 54a and 54b are provided in the bore 14 downstream of its intersection with the passage 16. A choke seat 56 is also disposed in the bore upstream from the liner 54b, and a seal ring 58 extends in a groove formed in the outer surface of the choke seat and engages a corresponding portion of the inner surface of the housing 12. The choke seat 56 and, therefore, the liners 54a and 54b are retained in the bore 14 by a static trim member 60. The liners 54a and 54b and the choke seat 56 define a discharge passage 62 in the bore 14 of the housing 12 extending from the intersection of the bore 14 and the passage 16 to the discharge end 14a of the bore 14. The internal diameter of the choke seat 56 is sized relative to the outer diameter of the choke member 36 to receive same. Manufacture of specific components of the back pressure control systems useful with apparatus according to embodiments disclosed herein may vary from that described in relation to FIG. 1.

Control fluid pressure, used to regulate the operating pressure of a back pressure control system, such as illustrated in FIG. 1, may be regulated and controlled via apparatus disclosed herein. During operation, control of the back pressure control system 10 may occur through use of an actuator (not shown) connected to connector shaft 30. Embodiments disclosed herein include apparatuses for connecting and disconnecting connector shaft 30 of the back pressure control system 10 to the actuator. Those of ordinary skill in the art will appreciate that the connector systems disclosed herein may be used on various types of back pressure control systems, including manual or automatically adjusting hydraulic chokes.

Figure 2:
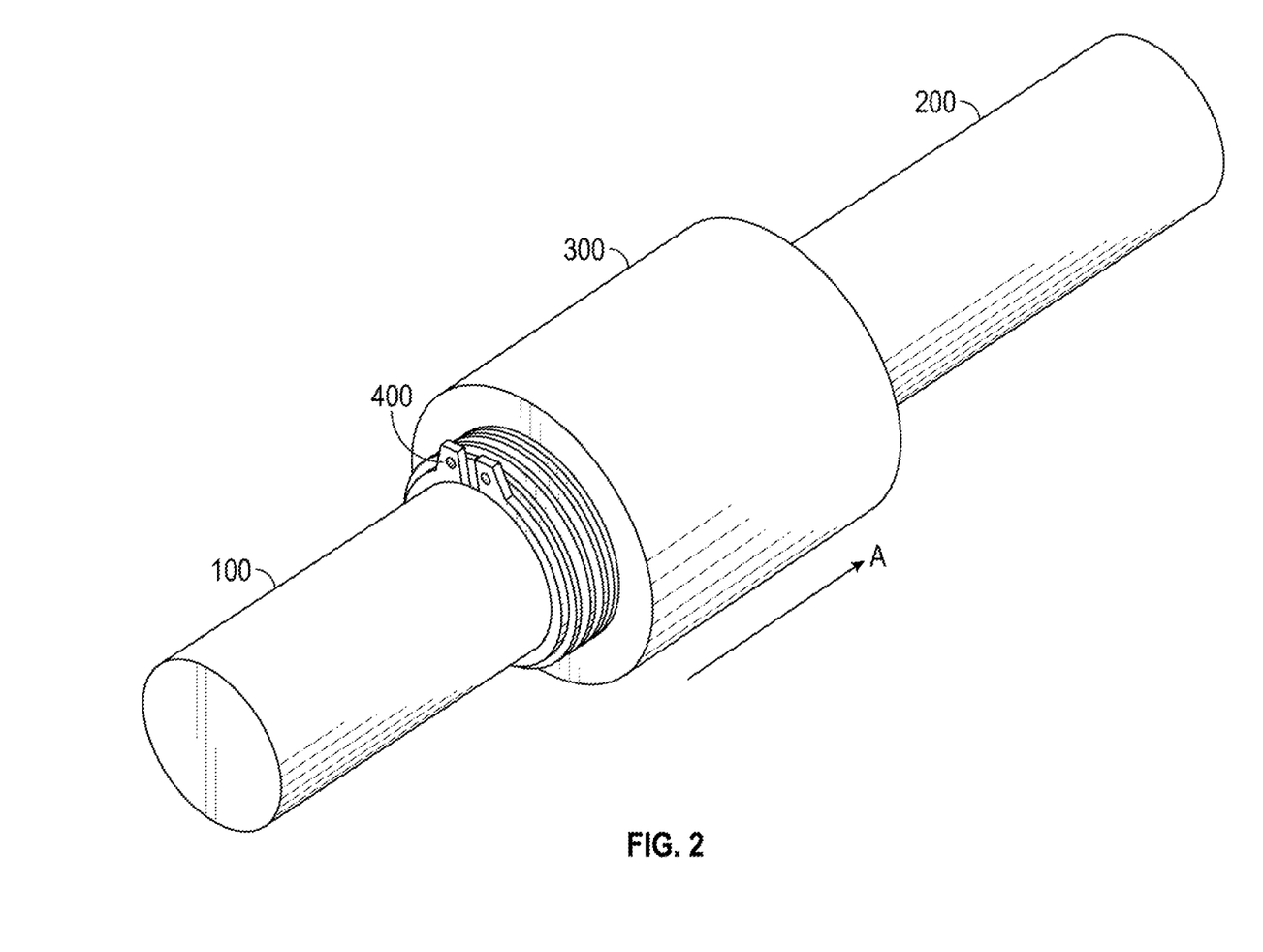
FIG. 2 is a perspective view of fluid control system connectors according to embodiments of the present disclosure.
Figure 3:
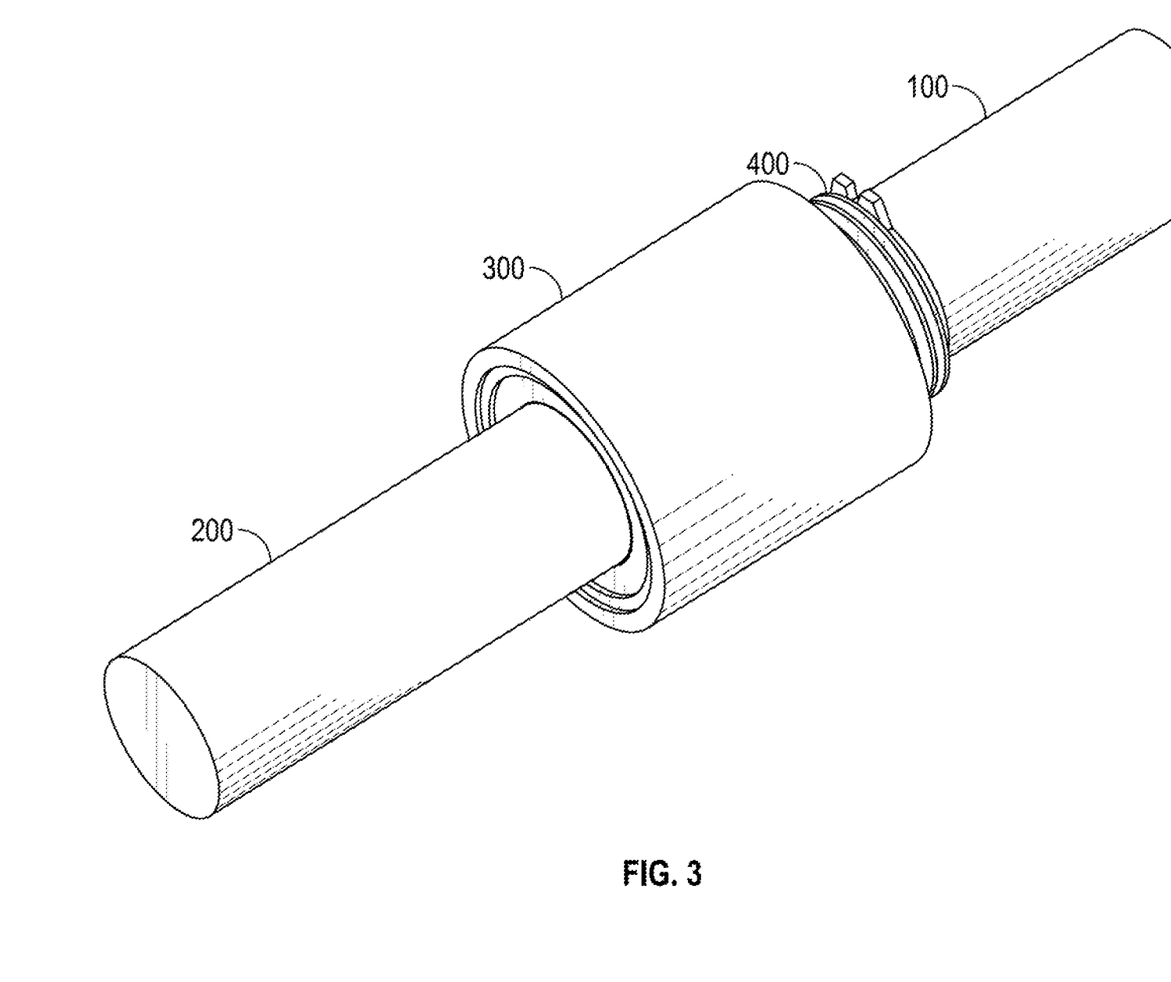
FIG. 3 is a perspective view of fluid control system connectors according to embodiments of the present disclosure.

Referring to FIGS. 2 and 3, perspective views of fluid control system connectors according to embodiments of the present disclosure are shown. In this embodiment, a first connector shaft 100, which is connected to a choke valve (not shown), such as the back pressure control system shown in FIG. 1 is connected to a second connector shaft 200. Second connector shaft 200 is coupled to an actuator (not shown), which may be used to control a fluid control system, such as a choke. First and second connector shafts 100 and 200 are connected in a collar 300, which is disposed around first connector shaft 100. A spring 400 is also disposed on first connector shaft 100 and configured to apply pressure to collar 300. As illustrated in FIGS. 2 and 3, spring 400 is pushing collar in direction A.

First and second connector shafts 100 and 200 may be limited from various metals and metal alloys including, for example, various grades of stainless steel. Similarly, collar 200 may be formed from various materials, such as various grades of stainless steel. Those of ordinary skill in the art will appreciate that first and second connector shafts 100 and 200, as well as collar 300 may be formed from or coated with various materials capable of withstanding the corrosive environment present at drilling locations. The specific materials used to form first and second connector shafts 100 and 200 and collar 300 is not meant to be a limitation on the present disclosure, and as such, in certain embodiments, other materials such as composites and/or plastics may also be used in forming first and second connector shafts 100 and 200 and collar 300.

Spring 400 may be attached to first connector shaft 100 through welding, brazing, or through mechanical attachments, such as rivets, bolts, etc. Additionally, the spring 400 used in a particular application may be selected based on its specific spring constant. In certain embodiments, a spring may be selected with a lower or higher spring constant to control the ease with which the spring is compressed. Spring 400 may be formed from various materials including, for example, ferrous metals, such as annealed steel, or in certain situations, non-ferrous metals, such as phosphor bronze, titanium, or similar metals, which may be used due to their resistance to corrosion.

Figure 4:
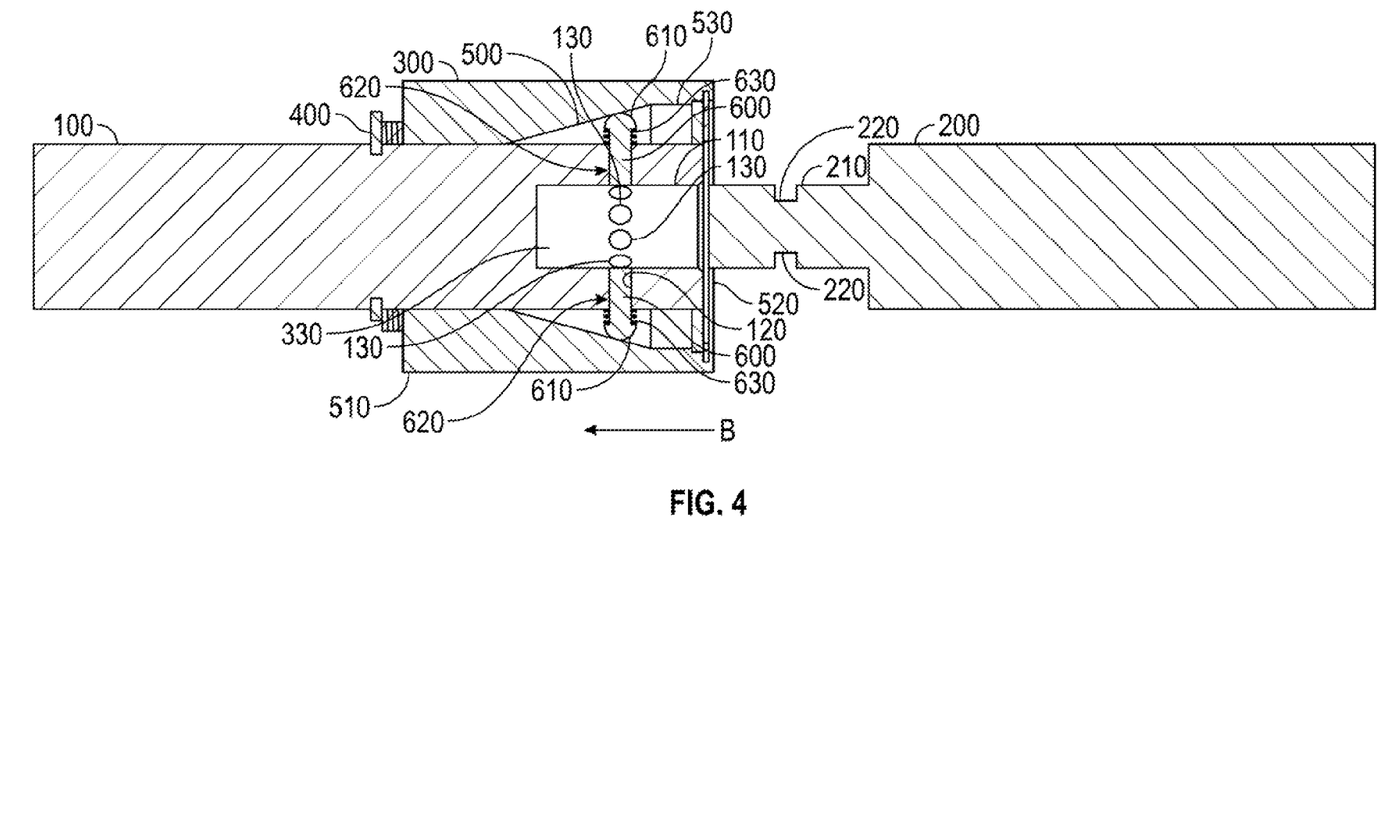
FIG. 4 is a cross-sectional view of fluid control system connectors according to embodiments of the present disclosure.

Referring, to FIG. 4, a cross-sectional view of fluid control system connectors according to embodiments of the present disclosure is shown. Collar 300 has an internal taper 500 that radially expands from a first collar end 510 to a second, distal, collar end 520. The slope of the taper may vary depending on specific requirements for the fluid. control system connectors. As illustrated, internal taper 500 progresses substantially constantly from proximate first end 510 to the second end 520, until the internal taper 500 results in a maximum radial expansion 530. The slope, in some embodiments, may be less than 45 degrees to the axis of the shaft. A slope higher than 45 degrees may prevent the coupler from closing in some embodiments; however, any slope less than 45 degrees should be acceptable.

Collar 300 also has a plurality of engagement pins 600 disposed within the collar 300 and in contact with internal taper 500. Engagement pins 600 may be of various geometries, so long as a distal portion 610 of the engagement pins 600 are configured to contact and slide against internal taper 500. As illustrated, one geometry that may be used in forming distal portion 610 is a rounded or arcuate geometry that may allow engagement pins 600 to more easily traverse internal taper 500 during movement of collar 300. Engagement pins 600 may be formed from various materials, such as metal, metal alloys, plastic, composites, and the like. In order to hold engagement pins 600 in place, the distal portion 610 may have a larger diameter than engagement pin body 620. As illustrated, a spring 630 may be disposed between distal portion 610 and first connector shaft 100, thereby biasing engagement pin 600 into an open or radially outward position. In an open position, engagement pins 600 are retracted within collar 300, and do not project into internal bore 330. Said another way, in an open position, engagement pins 600 are retracted entirely within a recess 120 of first connector shaft 100 and collar 300.

As illustrated, the fluid control system connectors are shown prior to second connector shaft 200 being inserted into collar 300. In FIG. 4, collar 300 has been moved in direction B, thereby compressing spring 400. When spring 400 is compressed, engagement pins 600 slide along internal taper 500 and are forced by spring 630 radially outward. As engagement pins 600 move in a radially outward direction, engagement pins 600 retract out of recess 120 of first connector shaft 100. Those of ordinary skill in the art will appreciate that depending on the amount of force applied to collar 300, in moving collar 300 in direction B, spring 400 may be compressed to a predefined point where engagement pins 600 are moved entirely out of internal bore 330. When engagement pins 600 are moved out of internal bore 330, second connector shaft 200 may be inserted into collar 300, and into engagement with first connector shaft 100.

Figure 5A:
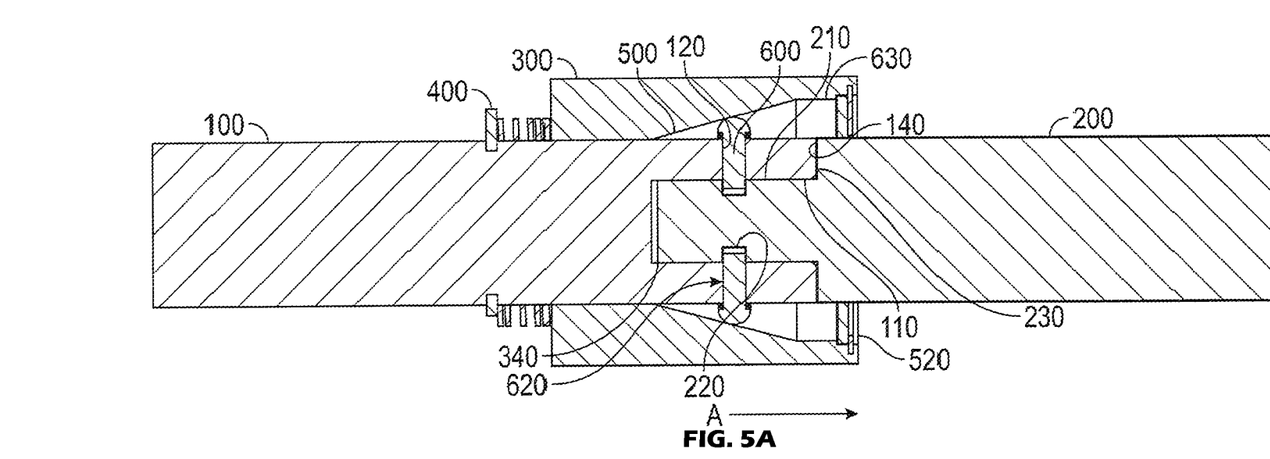
FIGS. 5A and 5B are cross-sectional views of fluid control system connectors according to embodiments of the present disclosure.

During engagement, an extension portion 210 of second connector shaft is inserted into a distal recess 110 of first connector shaft 100. Extension portion 210 includes a plurality of recesses 220 configured to receive engagement pins 600, when extension portion 210 is within distal recess 110. In certain embodiments, rather than a plurality of recesses 220, one or more grooves may be formed on extension portion 210. During engagement, engagement pins 600 extend through recesses 120 and apertures 130 of first connector shaft 100, and into plurality of recesses 220 of second connector shaft 200. FIG. 5A illustrates the engagement of second connector shaft 200 with first connecter shaft 100 within collar 300.

Referring to FIG. 5A, a cross-sectional view of fluid control system connectors according to embodiments of the present disclosure is shown. FIG. 5A illustrates second connector shaft 200 engaging first connector shaft 100 within collar 300. As illustrated, extension 210 is entirely within distal recess 100 and engagement pins 600 are extended into the plurality of recesses 220 on extension 210 In the closed position, indicated in FIG. 5A, spring 400 is not fully compressed, and is forcing collar 300 in direction A. As spring 400 forces collar 300 in direction A, engagement pins 600 slide along internal taper 500, compressing springs 630 and extending engagement pin body 620 through recesses 120 of first connector shaft into the plurality of recesses 220 of second connector shaft. In the closed position, first and second connector shafts 100 and 200 are engaged in a torque transmitting connection, and rotation and/or movement of second connector shaft 200 by, for example, an actuator (not shown), will result in movement being imparted to first connector shaft 100.

In order to provide proper engagement between first and second connector shafts 100 and 200, the length of extension 210 is formed to correspond to distal recess 110. Thus, the distance between recesses 220 of extension 210 and shoulder 230 of second connector shaft 200 correspond to the distance between recesses 120 and shoulder 140 of first connector shaft 100. In this embodiment, as shoulders 140 and 230 abut and engagement pins 600 are inserted into recesses 220, a gap 340 is formed between the end of extension 210 and distal recess 110. Gap 340 may be left open, or a seal (not shown) may be disposed therein. In an alternative embodiment, the end of extension 210 may abut distal recess 110.

Figure 6:
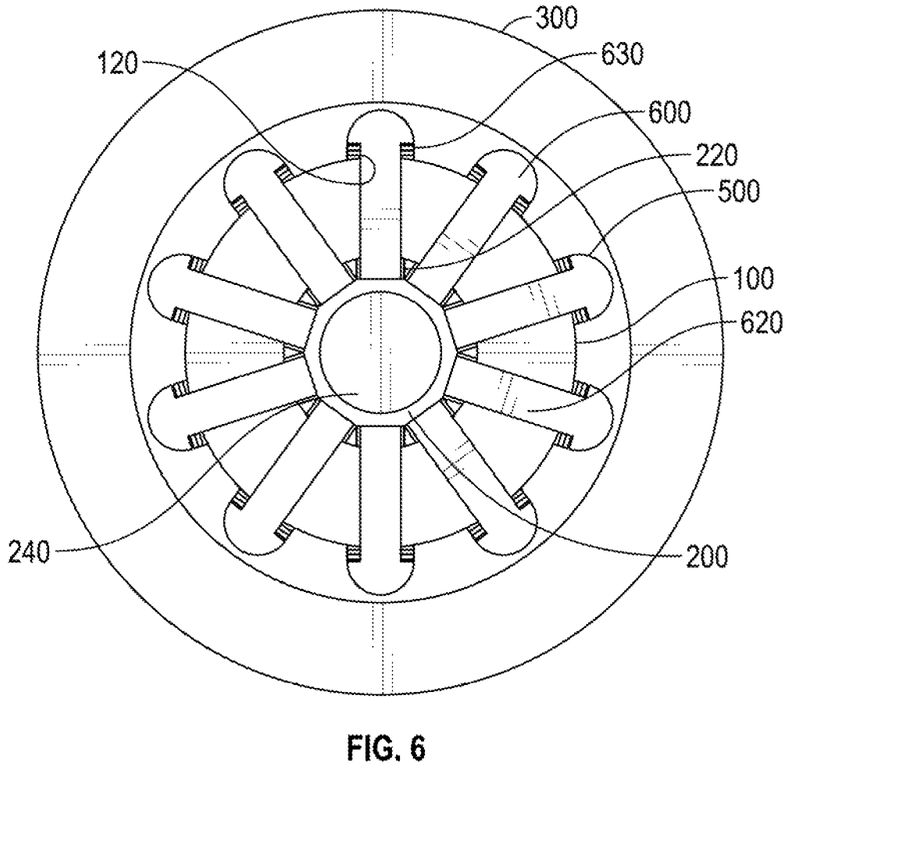
FIG. 6 is a cross-sectional view of fluid control system connectors according to embodiments of the present disclosure.

Referring, to FIG. 6, a cross-sectional view of the internal components of collar 300 is shown. In this embodiment, collar 300 is shown in a closed position, whereby engagement pins 600 extend through first connector shaft 100 into engagement with second connector shaft 200. As described above, in the closed position, the internal taper 500 forces springs 630 into compression, engagement pins 600 radially retract, such that the engagement pin bodies 620 slid through recesses 120 into recesses 220 of second connector shaft 200.

In this embodiment, second connector shaft 220 has a plurality of recesses, each configured to receive a single engagement pin 600. Second connector shaft 220 also has an internal bore 240, through which various materials, such as fluids, may be transmitted. As illustrated, collar 300 includes ten engagement pins 600; however, in alternate embodiments, 300 may include fewer or greater numbers of engagement pins 600, depending on the requirements of the particular fluid control system. For example, in alternative embodiments, collar 300 may include 6, 8, 12, or 14 pins. In still other embodiments, collar 300 may have a greater or lesser number of engagement pins than second connector shaft 200 has recesses 220. In such a situation, various second connector shafts may be used with various collars 300, even if the second connector shaft 200 was not formed to match the particular collar.

Figure 7:
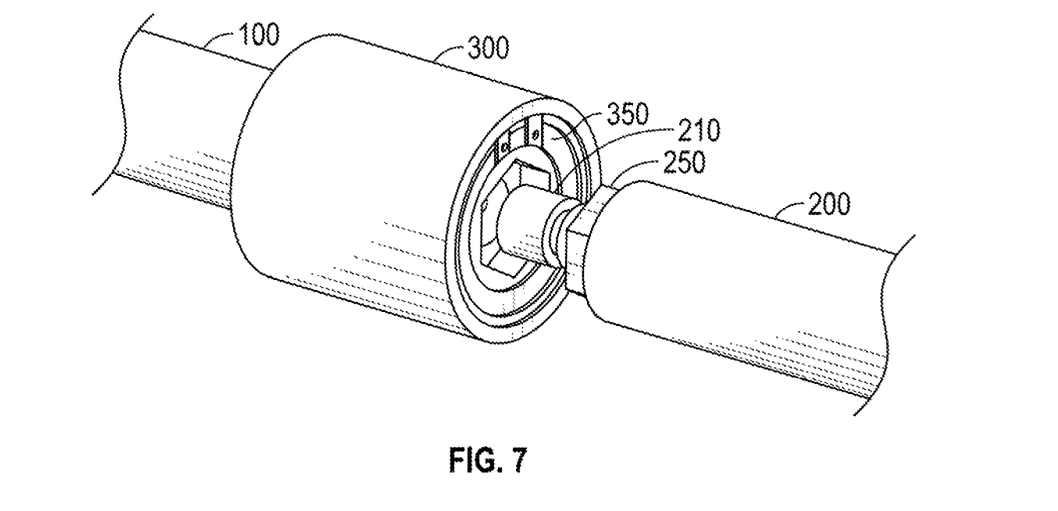
FIG. 7 is a perspective view of fluid control system connectors according to embodiments of the present disclosure.

Referring to FIG. 7, a perspective view of fluid control system connectors according to embodiments of the present disclosure is shown. In this embodiment, collar 300 is illustrated in an open position and configured to receive extension 210 of second connector shaft. Collar 300 has a distal engagement geometry 350 that corresponds to a distal engagement geometry 250 of second connector shaft 200. As illustrated, the corresponding geometries are hexagonal, however, those of ordinary skill in the art will appreciate that various other geometries, such as triangular, rectangular, octagonal, and the like may also be used. When second connector shaft 200 is engaged with first connector shaft 100 within collar 300, the corresponding distal geometries 250 and 350 thereby allow torque to be transmitted between second connector shaft 200 and collar 300 and/or first connector shaft 100. In another embodiment, first connector shaft 100 may also have a distal engagement geometry (not shown) that corresponds to distal engagement geometry 250 of second connector shaft, thereby allowing torque to be transmitted directly from second connector shaft 200 to first connector shaft 100.

In some embodiments, such as illustrated in FIG. 5A, one or more of seals 250, 260, 270 may be provided. For example, seals 250, 260 may seal collar 300 against shaft 100. Seal 270 may also be placed on the interface between shafts 100, 200, such as on the inner diameter of distal recess 110. Seals 250, 260, 270 may thus keep dirt or other contaminants out of the internal mechanism, as may be present at a wellsite.

Figure 5B:
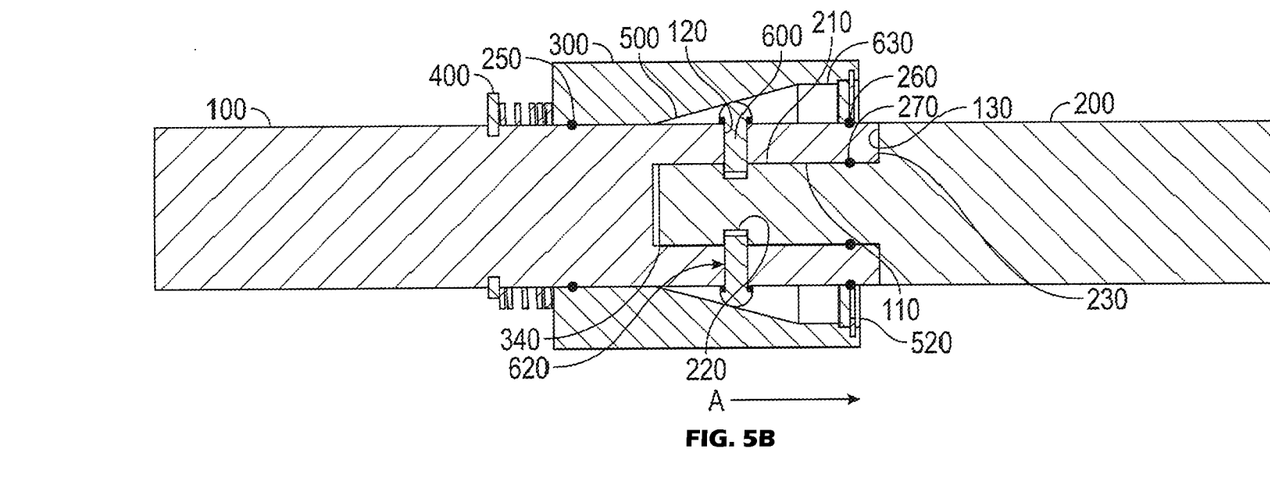

Embodiments herein also contemplate that, as illustrated in FIG. 5B, end 520 of collar 300 may interface with shaft 200. In other embodiments, such as illustrated in FIG. 5B, end 520 of collar 300 may interface with shaft 100.

Figure 8:
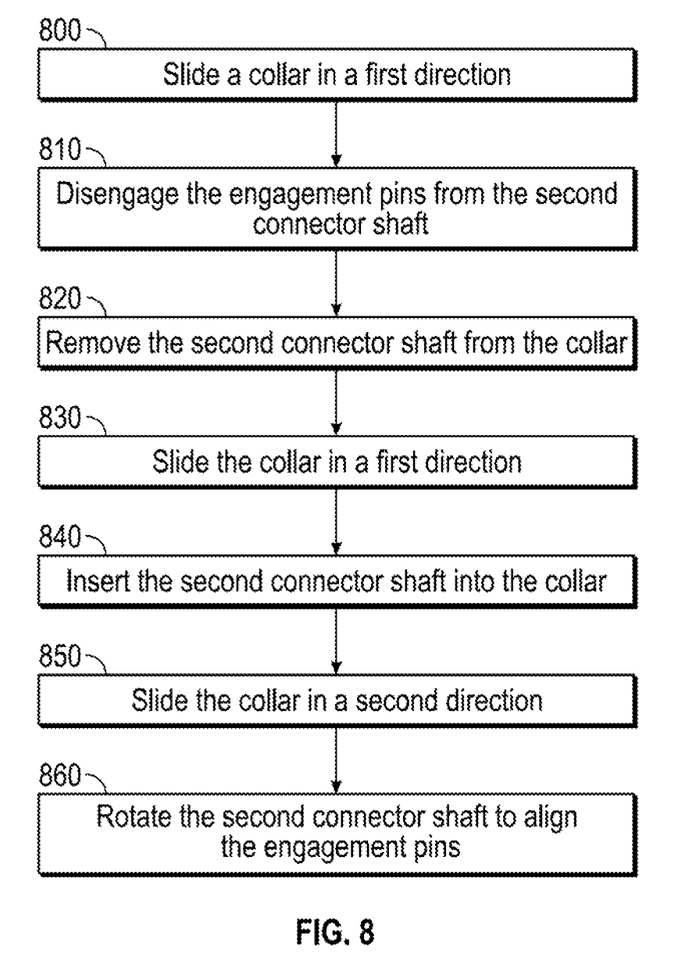
FIG. 8 is a flow chart showing a method of engaging/disengaging fluid cot system connectors according to embodiments of the present disclosure.

Referring to FIG. 8, a flow chart of a method of engaging and disengaging fluid control system connector according to embodiments of the present disclosure is shown. When first and second connectors are engaged within a collar, the connection allows an actuator to control a choke valve. However, during routine maintenance or in order to access the internal components of the choke valve, the actuator may be disconnected from the choke valve. In order to remove the actuator from the choke valve, the second connector shaft of the actuator may be disengaged from the first connector shaft of the choke valve. To disengage first and second connector shafts, an operator may slide 800 a collar that is disposed around the first and second connector shafts in a first direction, which as described in FIGS. 2-5 above is toward the choke valve. The sliding 800 causes a plurality of engagement pins disposed within the collar to disengage 810 the second connector shaft. After the engagement pins are disengaged 810 from the second connector shaft, the second connector shaft may be removed 820 from the collar by pulling the second connector shaft in a second direction, as described in FIGS. 2-5, away from the choke valve. The collar may then be released, which results in the collar sliding in the second direction due to the spring being in compression.

After the maintenance or repairs are complete and prior to using the fluid control system, the second connector shaft may be engaged, or reengaged, with the first connector shaft. In order to engage, or reengage, the first and second connector shafts, the collar is slid 830 in the first direction. After the engagement pins have retracted into the internal recesses of the first connector shaft and/or into the body of the collar, the second connector shaft is inserted 840 into the collar and into the distal recess of the first connector shaft. The collar is then slid 850 in the second direction, or otherwise released and allowed to slide on its own in the second direction. The engagement pins will then extend into the plurality of recesses formed within the extension of the second connector shaft. If, for some reason, the pins do not readily extend into the plurality of recesses, the second connector shaft may be rotated 860 in order to align the engagement pins with the plurality or recesses.

The engaging and disengaging may be repeated as required to access the internal components of the choke valve. Those of ordinary skill in the art will appreciate that depending on the specific make-up of the collar and first and second connector shafts, the method may vary. For example, in certain embodiments, where the collar and first and/or second connectors have distal engagement geometry, the second connector shaft may be rotated prior to insertion into collar in order to align the distal engagement geometry. Those of ordinary skill in the art will appreciate that in addition to the distal engagement geometry allowing torque to be transmitted between the first and second connectors, the distal engagement geometry may allow the engaging, and reengaging of the first and second connector shafts to occur more quickly due to the engagement pins and recesses being aligned.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed:

1. A system comprising:
   a choke valve having a first connector shaft;
   an actuator having, a second connector shaft;
   a collar disposed around the first and second connector shafts, the collar comprising:
      an internal taper;
      a plurality of engagement pins; and
      a first spring extending between the internal taper and a radial exterior surface of the first connector shaft and contacting the radial exterior surface of the first connector shaft; and
   a second spring disposed on the first connector shaft such that an end of the second spring directly contacts an exterior surface of the collar.

2. The system of claim 1, wherein the second connector shaft comprises an extension configured to engage a distal recess of the first connector shaft.

3. The system of claim 1, wherein the first connector shaft comprises a distal engagement geometry and the second connector shaft comprises a corresponding distal engagement geometry.

4. The system of claim 1, wherein the collar comprises a first end and a second end and wherein the internal taper radially expands from the first end to the second end.

5. The system of claim 1, wherein the collar comprises an end seal.

6. The system of claim 1, wherein the first connector shaft comprises a distal recess configured to receive an extension of the second connector shaft.

7. The system of claim 6, wherein the first connector shaft further comprises a plurality of recesses that receive the plurality of engagement pins.

8. The system of claim 7, wherein each of the plurality of engagement pins is disposed within a corresponding one of the plurality of recesses along the first connector shaft when the second spring is compressed.

9. The system of claim 7, wherein the second connector shaft has a plurality of pin recesses disposed radially about the extension.

10. The system of claim 9, wherein the plurality of engagement pins extend through the first connector shaft into the plurality of pin recesses.

11. A method comprising:
sliding a collar disposed around a first connector shaft and a second connector shaft along the first connector shaft in a first direction;
disengaging a plurality of engagement pins from the second connector shaft by moving the plurality of engagement pins along an internal taper of the collar that faces an end of the collar adjacent to the second connector shaft;
maintaining a spring against a distal portion of one engagement pin and a radial exterior surface of the first connector shaft while sliding the collar and disengaging the plurality of engagement pins; and
removing the second connector shaft from the collar in a second direction.

12. The method of claim 11, further comprising:
sliding the collar in the first direction;
inserting a third connector shaft into the collar; and
sliding the collar in the second direction.

13. The method of claim 11, wherein the disengaging comprises:
moving the plurality of engagement pins towards a maximum radial expansion of the internal taper adjacent the end of the collar that is adjacent to the second connector shaft.

14. The method of claim 11, wherein the engagement pins are received by a recess in the second connector shaft when a spring biases the collar.

15. The method of claim 11, wherein a spring disposed on the first connector shaft is in compression when the second connector shaft is removed from the collar.

16. The method of claim 11 comprising reengaging the second connector shaft.

17. The method of claim 16, wherein the reengaging comprises:
sliding the collar in the first direction;
inserting the second connector shaft into the collar; and
sliding the collar in the second direction.

18. An actuator connection comprising:
a first connector shaft comprising a plurality of pin recesses;
a collar disposed on the first connector shaft, the collar comprising an internal tapered recess and a plurality of engagement pins;
a spring extending between a distal portion of one engagement pin and a radial exterior surface of the first connector shaft; and
a second connector shaft configured to engage the first connector shaft within the collar.

19. The actuator connection of claim 18, wherein the second connector shaft comprises a groove configured to receive the plurality of engagement pins.

20. The actuator connection of claim 18, wherein an extension of the second connector shaft comprises a plurality of recesses, and wherein when the second connector shaft is disposed within the collar, the plurality of engagement pins are disposed within the plurality of recesses of the second connector shaft and a plurality of pin housings of the first connector shaft.

* * * * *